United States Patent Office 3,152,298
Patented Oct. 6, 1964

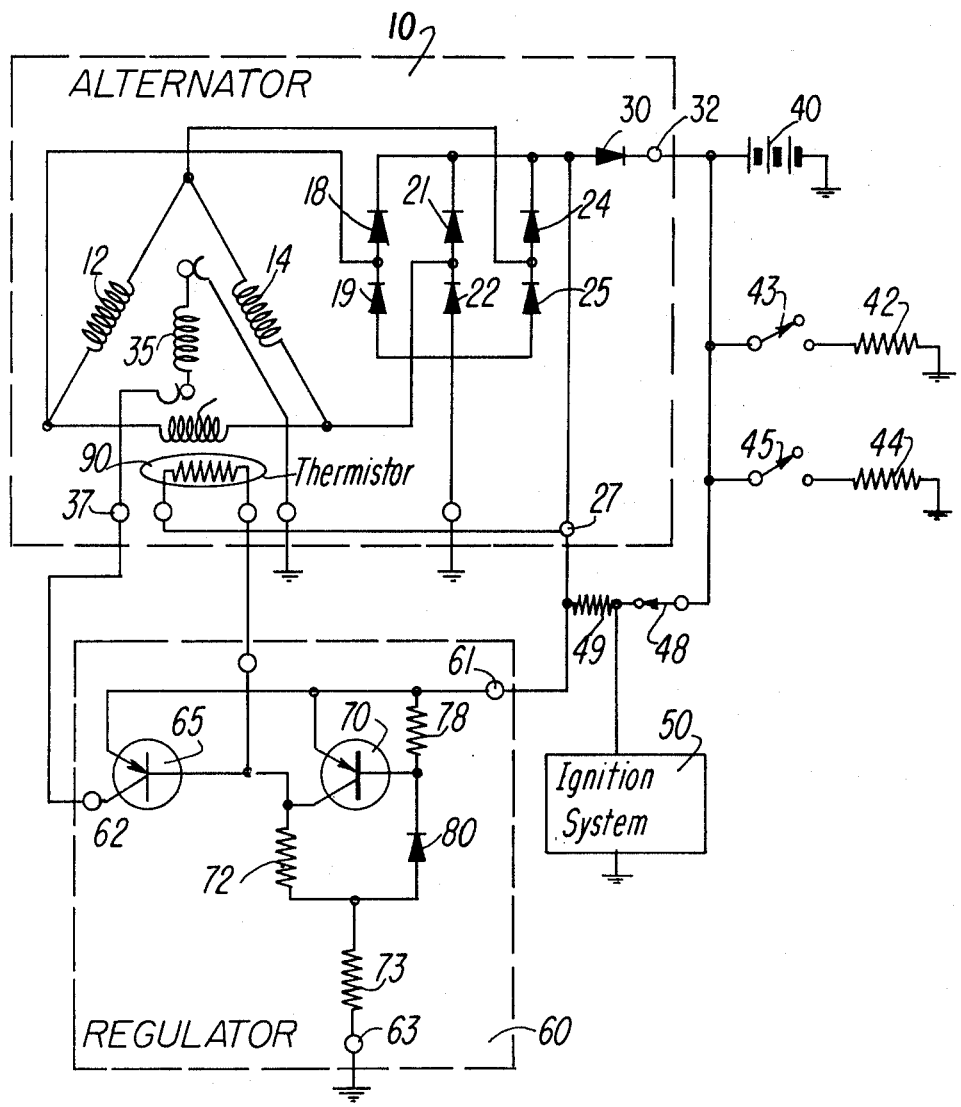

3,152,298
GENERATOR FIELD WINDING REGULATION WITH DIRECT THERMISTOR CONTROL OF THE FIELD WINDING CONTROL CIRCUIT
Theodore A. Byles, Villa Park, Ill., assignor to Motorola, Inc., Chicago, Ill., a corporation of Illinois
Filed Oct. 17, 1961, Ser. No. 145,566
4 Claims. (Cl. 322—73)

This invention relates to a vehicular electrical system and more particularly to such a system which incorporates an alternator or generator with a temperature limited voltage and current regulator.

Many present day vehicles such as automobiles use a generator or alternator to charge a battery for the electrical system. The speed of these generators or alternators, and hence their output, is generally governed by the speed at which the engine of the automobile is operated. Many devices have been used to regulate the output of the generator or alternator, usually by weakening or strengthening the current in the field coils.

With increasing knowledge and improved components in the field of electronics, it is now possible to build a regulating device which functions electronically. However, some problems still remain. A short circuit reducing the output voltage to low values could cause excessive damage or failure, the regulator failing to reduce the field current because of the low output voltage of the alternator. Furthermore, a regulator might not take into account ambient temperature variation. That is, at low ambient temperature it may be possible to operate the alternator or generator at much higher output voltage than would be safe during a high ambient temperature period.

Consequently, a purpose of this invention is to design a transistor regulator which is sensitive to heat as well as voltage and which is low in cost yet reliable.

A further object of the invention is to provide a heat sensitive voltage regulator which will compensate for ambient temperature differences.

Another object of this invention is to provide a heat sensitive transistor type regulator which will provide short circuit protection and therefore prevent resultant component failures.

A feature of this invention is a resistor having a negative temperature coefficient, known as a thermistor, connected across the base and emitter of a field winding control transistor of a transistor type regulator and placed in thermal proximity to a vital component in the circuit.

The drawing is a schematic diagram of an automobile electrical system showing the invention.

In brief, the invention includes a thermistor connected across the base and emitter of the field winding control transistor of a transistor type regulator. Such a regulator may be designed and adapted for use in a vehicular electrical system incorporating an alternator and a storage battery. The thermistor is placed in thermal proximity to a vulnerable component in the system, for example the battery or an armature winding of the regulator. As the temperature of the thermistor rises, its resistance decreases, causing the base of the transistor to become more positive, reducing is output. Reduced output of the transistor is accordingly reflected in reduced voltage on the field windings of the alternator causing a reduction in alternator output.

In the drawing the alternator 10, which may be driven from the engine of a vehicle in which the electrical system is incorporated, includes armature windings 12, 14 and 16 connected in delta. As an alternative, a Y connection could also be used. The corners of the delta are connected to the respective interconnections of the power rectifier pairs 18, 19 and 21, 22 and 24, 25. The equivalent of the anodes of the rectifiers 19, 22 and 25 are all interconnected to the frame of the alternator or a reference ground. The equivalent of the cathode of rectifiers 18, 21 and 24 are interconnected to an intermediate output terminal 27 of the alternator. A direct current voltage, positive with respect to the reference point, appears at terminal 27 in response to full wave rectification of the three phase output of the armature windings 12, 14 and 16 and the bank of rectifiers.

An isolation diode 30, preferably included with rectifiers 18, 19; 21, 22; and 24, 25 as a structural part of the alternator 10, is connected between the output terminal 27 and the further output terminal 32. The diode 30 is poled to provide conduction from output terminal 27 to the output terminal 32. A field winding 35 of the alternator is connected through the usual slip rings and brushes to the ground conductor or reference frame of the alternator, and to a field current supply terminal 37.

A storage battery 40, providing for example 12 volts, is connected between the output terminal 32 of the alternator and the reference point of the electrical system. Various items of electrical equipment are shown representatively connected to the battery 40. These include an electrical load 42 series connected with a control switch 43 across the battery 40 and an electrical load 44 series connected with switch 45 across the battery 40. The electrical loads 42, 44 could represent such items as a starter for the vehicle, lights for the vehicle, a radio for the vehicle, or any other piece of electrical equipment.

An ignition switch 48 includes a movable contact connected to the positive terminal of battery 40 and a fixed contact connected to the ignition circuit 50 for an internal combustion engine of the vehicle. Resistor 49 provides current from battery 40 through regulator 60 to field winding 35 for initial exictation upon starting.

The transistorized voltage regulator 60 has an input terminal 61 connected to the intermediate terminal 27 of the alternator 10. The regulator further includes a field current supply terminal 62 connected to terminal 37 of the alternator. Regulator 60 is connected to ground, or the reference point for the electrical system, through a suitable reference conductor 63.

It may be seen that the PNP power transistor 65 of the regulator 60 has a collector electrode connected to terminal 62 and an emitter electrode connected to the terminal 61. Accordingly, the emitter-collector current path of transistor 65 conducts current from the intermediate output terminal 27 of the alternator to the field winding 35 of the alternator.

The current or potential for the base electrode of transistor 65 is varied in accordance with the output voltage of the alternator 10 at its terminal 27 in order to control the current in field winding 35 for regulating the alternator output to a substantially constant voltage. A base control circuit for transistor 65 is established by the emitter-collector electrode current path of PNP control transistor 70 and the resistors 72 and 73 which are connected in series between terminal 61 and the reference point 63. The junction of the collector of transistor 70 and the resistor 72 is connected to the base of transistor 65.

Resistors 72 and 73 also act as a voltage divider connected in series with the thermistor 90 between the reference point 63 and terminal 61. A further resistor 78 is connected in series with the zener diode 80 between the terminal 61 and the junction of resistors 72 and 73. The junction of resistors 78 and diode 80 is connected with the base of transistor 70. The voltage divider 72, 73 will thus establish a potential on the diode 80 so that it can conduct in a reverse direction when a given voltage exists across the terminals 61 and 63 of the voltage regulator. Once the diode 80 is in reverse conduction there will be a constant potential established at the base of transistor 70 so that any voltage variation at the terminal 61 will be reflected as a potential change at the emitter electrode of transistor 70.

Accordingly, as the potential of the alternator at intermediate terminal 27 increases above the predetermined value at which the bias circuit for the base of transistor 70 has been designed, diode 80 will conduct to establish a fixed potential at the base electrode of transistor 70, and the emitter potential of transistor 70 will increase to cause increased conduction through the emitter to collector path of transistor 70. Correspondingly, the potential of the base electrode of transistor 65 will be established at a more positive potential to reduce the emitter-collector conduction therein and thus reduce the current supplied to the rotating field winding 35 of the alternator. With reduced field current, the output potential of the alternator will decrease so that the potential on the regulator terminal 61 is low enough to cause cutoff of diode 80 and a resultant decrease in conduction of transistor 70, thereby increasing the conduction of transistor 65. This will bring about an increase in current applied to the field winding 35 causing the voltage output of the alternator to again increase. Such cycling of the alternator output potential above and below the established regulation point of the regulator 60 will continue at a faster or slower rate depending upon the speed at which the alternator turns and its output voltage. This will average the current through the field winding 35 to provide a regulated potential from the alternator.

Thermistor 90 connected between the base and emitter of the field winding control transistor 65 is placed in thermal proximity to the most vulnerable component in the system. In the drawing it is shown in the armature winding 16 inside the alternator 10 but it may also be placed in the battery, rectifier, or any other place which is prone to heat failure.

As heating from any cause takes place, including ambient temperature variations, the resistance of the thermistor decreases causing more current to flow through the resistor 72 or the transistor 70 depending on the potential across the diode 80 at the time. This causes the base of transistor 65 to become more positive reducing the flow of current from the emitter to collector of transistor 65, thereby reducing current in the field winding 35, which is connected to the collector of transistor 65. The alternator output is correspondingly reduced preventing overheating. Since the thermistor is indepent of voltage it will reflect ambient temperature variation, heating from short circuit, or other external sources of heat regardless of the voltage level of the alternator output.

Although the system shown is one containing an alternator, the use of this invention is not limited to such a system but may be used in conjunction with a generator as well.

I claim:

1. In a vehicular electrical system incorporating a battery charging circuit including voltage producing means having a field winding therein, a transistor type regulator having an output transistor and means for connecting the same between the output of the voltage producing means and the field winding of the voltage producing means to control the current therein, a thermistor having a negative temperature coefficient and adapted to be located in thermal proximity to a heat vulnerable element of the system, means connecting said thermistor to said output transistor to decrease the forward bias thereon as the resistance of said thermistor decreases thereby reducing the current in said field winding of said voltage producing means.

2. In a vehicular electrical system incorporating an alternator, rectifier and storage battery, a transistor-type regulator having a PNP output transistor connectable in series between the field winding of the alternator and the output of the alternator, a voltage sensitive circuit connectable to the output of the alternator and connected to the base electrode of said output transistor, a negative temperature coefficient thermistor to be located in thermal proximity to a heat vulnerable element of the system connected to said base electrode and connectable to the output of the alternator so that a decrease in the resistance of said thermistor causes the base electrode of said output transistor to become more positive, reducing current flow through said transistor whereby field winding current is reduced.

3. In a vehicular electrical system incorporating a battery charging circuit, including voltage producing means having a field winding therein and also including a negative temperature coefficient thermistor located in thermal proximity to said voltage producing means, a transistor type regulator having a PNP output transistor connectable in series between the field winding of the alternator and the output of the alternator, a voltage sensitive circuit connectable to the output of the alternator and connected to the base electrode of said output transistor, and conducting means having terminal means connected thereto permitting connection of the thermistor between the output of the alternator and the base electrode of said output transistor.

4. In a vehicular electrical system incorporating a battery charging circuit including voltage producing means having a field winding therein, a voltage regulator having input and output terminals adapted for connection between the output of the voltage producing means and the field winding, said regular including in combination, an output transistor having base, emitter and collector electrodes with the emitter to collector path thereof series connected between said input and output terminals, a control transistor having base, emitter and collector electrodes with the emitter to collector path thereof series connected between said input terminal and said base electrode of said output transistor, a bias circuit for said control transistor and including voltage sensing means rendering said control transistor conductive when the voltage at said input terminal exceeds a predetermined level, and a bias circuit for said output transistor and including resistance means connecting the base electrode of said output transistor to a reference potential and a negative temperature coefficient thermistor adapted to be located in thermal proximity to the voltage producing means, means connecting said thermistor between the output of the voltage producing means and said base electrode of said output transistor, said thermistor decreasing in resistance in response to rise in temperature of the voltage producing means to raise the potential at the base electrode of said output transistor and thereby reduce current flow between said input and output terminals, thereby reducing current in the field winding of the voltage producing means.

References Cited in the file of this patent

UNITED STATES PATENTS 2,892,143    Sommer _____ June 23, 1959

FOREIGN PATENTS 383,917    Germany _____ Nov. 7, 1923